United States Patent [19]
Stringer

[11] 3,793,537
[45] Feb. 19, 1974

[54] FIRING CIRCUITRY FOR SEMICONDUCTIVE CONTROLLED RECTIFIERS

[75] Inventor: Loren F. Stringer, Clarence, N.Y.

[73] Assignee: Westinghouse Electric Corporation, Pittsburgh, Pa.

[22] Filed: Sept. 25, 1972

[21] Appl. No.: 292,214

[52] U.S. Cl. ..... 307/252 N, 307/252 T, 323/22 SC, 323/24

[51] Int. Cl. ..... H03k 17/60

[58] Field of Search 307/133, 252 A, 252 B, 252 N, 307/252 T, 252 UA; 323/18, 19, 22 SC, 22 Z, 24, 34

[56] References Cited

UNITED STATES PATENTS

| | | | |
|---|---|---|---|
| 3,702,941 | 11/1972 | Aiduck et al. | 307/133 |
| 3,728,557 | 4/1973 | Pelly et ak. | 307/252 UA |
| 3,487,233 | 12/1969 | Reap | 323/22 Z |
| 2,486,042 | 12/1969 | W[trous.' | 307/252 |
| 3,665,219 | 5/1972 | Teske | 323/22 SC |
| 3,693,069 | 9/1972 | Kelley et al. | 307/252 T |

OTHER PUBLICATIONS

Ernst & Wells, "Current Zero-Crossing Detection for Thyristor Control," IBM Technical Disclosure Bulletin, Vol. 15, No. 3, August 1972, page 734.

*Primary Examiner*—A. D. Pellinen
*Attorney, Agent, or Firm*—J. J. Wood

[57] ABSTRACT

Firing circuitry for semiconductive controlled rectifiers and the like wherein transformer isolation is required between the gate of the rectifier and a firing circuit, and incorporating means for assuring that a firing pulse is applied to the gate electrode only when the rectifier is in condition for firing with its cathode negative with respect to its anode. This is accomplished by sensing the voltage across the rectifier and enabling the firing circuitry only when the voltage is of the correct polarity.

2 Claims, 2 Drawing Figures

PATENTED FEB 19 1974

3,793,537

FIRING CIRCUITRY FOR SEMICONDUCTIVE CONTROLLED RECTIFIERS

BACKGROUND OF THE INVENTION

Figure 1:
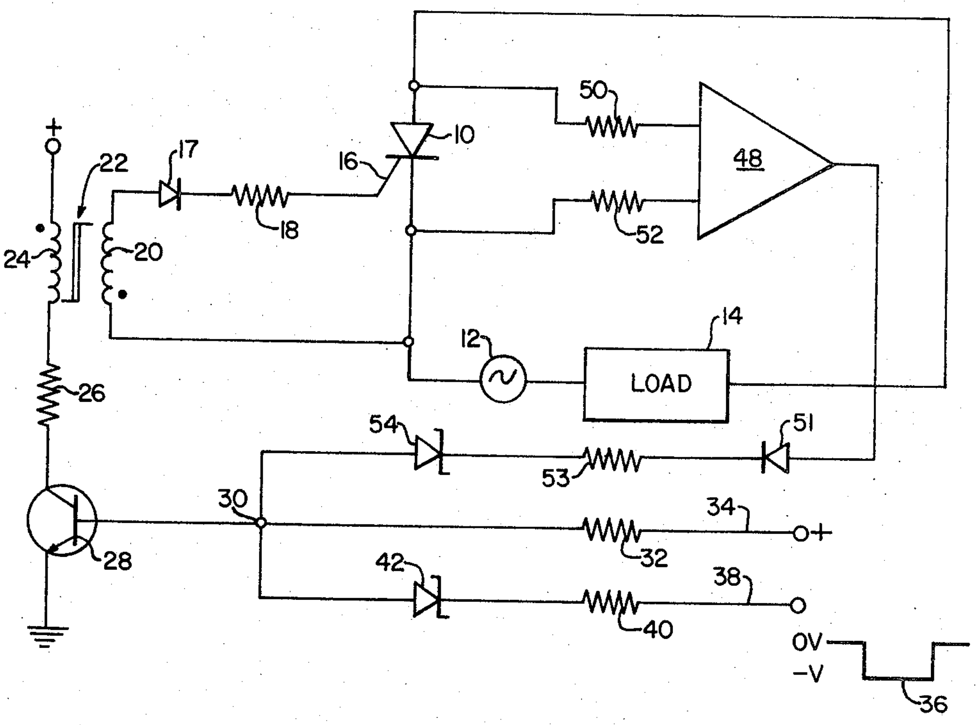

While not necessarily limited thereto, the present invention is particularly adapted for use in alternating current phase control systems. Such systems have found widespread use in controlling power supplied to an electrical load from an alternating current source and include semiconductive controlled rectifiers or the like which are cut off during a portion of an applied alternating current waveform, but which are gated ON after a predetermined time delay whereby the rectifier will deliver to the load only a selected part of the available power. The rectifier can be gated ON after a predetermined time delay following the zero crossing of every other half cycle of an applied alternating current waveform, in which case the power delivered to the load is a function of the time delay between the zero crossing and the leading edge of a firing pulse. This is called phase angle control. Alternatively, the rectifier can be fired at the zero crossing of a waveform and remains ON for a number of cycles, after which it is cut off for a number of cycles, the ratio of the ON and OFF times determining the amount of power delivered to the load. This is normally referred to as time proportioning control.

In either case, whether time proportioning or phase angle control is employed, it is necessary in certain cases to provide transformer isolation between a firing circuit and the gate electrode. In this case, the transformer can deliver to the gate electrode only a very narrow pulse since transformer action depends upon a change in flux which occurs only at the leading and trailing edges of the firing pulse. The firing pulses are normally synchronized with the alternating current waveform applied across the rectifier; however, due to various factors, the phase of the applied waveform may vary as it appears across the rectifier. In order to fire the rectifier, its anode must be positive with respect to its cathode. That is, and assuming that the rectifier can conduct during the positive half cylce of an applied alternating current waveform, the firing pulse must be applied to the gate electrode of the semiconductive controlled rectifier after the zero crossing of the applied waveform going in the positive direction. This can be assured by applying a firing pulse of increased length; however, this is not possible when transformer isolation is required for the reasons given above.

SUMMARY OF THE INVENTION

In accordance with the present invention, a new and improved firing circuit for semiconductive controlled rectifiers is provided which incorporates transformer isolation but wherein the necessity for a wide gate pulse is eliminated to compensate for a shift in phase of the waveform applied across the rectifier. This is achieved by sensing the polarity of the waveform across the rectifier and enabling firing of the rectifier through an isolation transformer only when the proper polarity exists across the rectifier for firing.

In one embodiment of the invention shown herein, the polarity across the rectifier is sensed by means of a common mode isolation amplifier, the output of this amplifier being applied through an isolation diode and a Zener diode to a summing point with a logic pulse which triggers the firing pulse for the rectifier. Unless the polarity across the rectifier is correct for firing, the output of the common mode isolation amplifier will cancel the logic pulse at the aforesaid summing point. However, when the polarity is correct, the circuitry is enabled to apply a firing pulse to the rectifier through the isolation transformer.

The above and other objects and features of the invention will become apparent from the following detailed description taken in connection with the accompanying drawings which form a part of this specification, and in which:

FIG. 1 is a schematic circuit diagram of one embodiment of the invention; and

Figure 2:
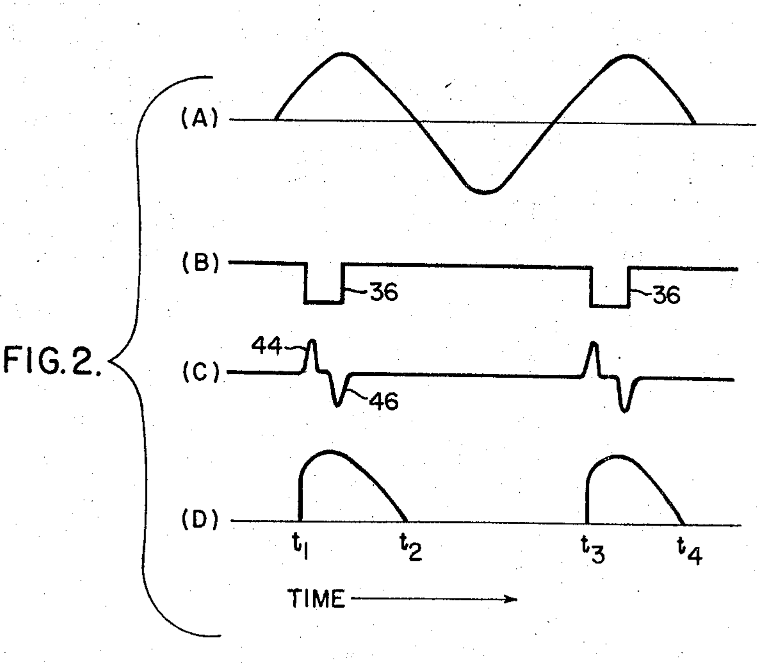

FIG. 2 comprises waveforms illustrating the operation of the circuit of FIG. 1.

With reference now to the drawings, and particularly to FIG. 1, a single semiconductive controlled rectifier or thyristor 10 is shown connected in series with a source of alternating current power 12 and a load 14. When the polarity across the rectifier 10 is such that its anode is positive with respect to its cathode, and assuming that a positive pulse is applied to its gate electrode 16, the rectifier 10 will conduct and will continue to conduct, even though the gate pulse is removed, until the applied waveform drops to zero; whereupon the rectifier 10 cuts off.

Gating pulses are applied to the gate electrode 16 through diode 17, resistor 18 and the secondary winding 20 of an isolation transformer 22. The transformer 22, for example, may be a ferrite pot transformer with an air gap. The primary winding 24 of transformer 22 is connected in series with resistor 26 and NPN transistor 28 between a source of positive potential and ground. The base of transistor 28 is connected through summing point 30 and resistor 32 to terminal 34 to which is applied a positive voltage which normally saturates the transistor 28 such that it is conducting. A logic pulse 36, synchronized with the applied alternating current waveform from source 12, is applied to terminal 38 and through resistor 40 and Zener diode 42 to the summing point 30. It will be noted that the pulse 36 is negative-going. Hence, assuming that the amplitude of the negative-going pulse 36 is sufficient to break down the Zener diode 42, it will overcome the positive bias on terminal 34 and cut off transistor 28, thereby causing a collapse in the flux across transformer 22 to induce a pulse in secondary winding 20 and cause the controlled rectifier 10 to fire.

The operation of the circuit is generally shown in FIG. 2 where waveform A comprises an alternating current waveform from source 12 while waveform B comprises the logic pulses 36 applied to terminal 38. It will be noted that one pulse occurs in waveform B during each positive half cycle of the applied waveform A; however, this pulse is delayed with respect to the zero crossing of the waveform A. A similar waveform will appear across primary winding 24 of transformer 22. The waveform across secondary winding 20 may appear as waveform C where spiked pulses 44 and 46 appear at the leading and trailing edges of each pulse in waveform B since it is only at this time that there is a change of flux in the transformer 22. Diode 17 is required to block the secondary voltage during the reset of the transformer core where transistor 28 is switched from the OFF to the ON state following the generation of a gating pulse. The spiked pulse 44, as applied to the gate electrode 16, then causes the controlled rectifier 10 to fire at time $t_1$ as shown by waveform D where is the voltage appearing across the load 14. After the rectifier 10 once fires at time $t_1$, it will continue to conduct until time $t_2$ where the applied waveform crosses the zero axis going in the negative direction. During the negative half cycle, the rectifier 10 cannot conduct since its anode is now negative with respect to its cathode. However, when it again goes positive and at time $t_3$ when the next logic pulse is applied, the controlled rectifier 10 will again conduct until the time $t_4$ when the applied waveform again passes through the zero axis. The power supplied to the load is proportional to the area under waveform D. It can be seen that this area can be varied by increasing or decreasing the phase angle of the logic pulses in waveform B with respect to the zero crossing of the applied waveform A.

In certain cases, it may happen that when the pulse 44 in waveform C occurs, the waveform appearing across the rectifier 10 has not yet crossed the zero axis going in the positive direction due to variations in the load 14. Under these circumstances, the rectifier will not fire. This problem can be alleviated by increasing the width of the logic pulse; however, this is not possible in the case of transformer isolation as explained above since the firing pulse occurs only upon a change in flux across the transformer. In accordance with the present invention, this possibility is eliminated by sensing the voltage across the rectifier 10 and disabling the firing circuit until the correct voltage appears across the rectifier; whereupon the firing circuit is enabled and the transistor 28 will cut off in response to a pulse 36, thereby to produce the pulse 44. In this respect, a common mode isolation amplifier 48 is provided having two inputs connected through resistors 50 and 52 to the anode and cathode, respectively, of the rectifier 10. Assuming that the anode of rectifier 10 is negative with respect to its cathode and that the rectifier is not in condition for conduction, the output of the amplifier 48 will be positive. This is applied through diode 51, resistor 53 and Zener diode 54 to the summing point 30, thereby insuring that the transistor 28 remains saturated and conducting even though a negative logic pulse is applied via lead 38. Hence, as long as the polarity across rectifier 10 is incorrect, transistor 28 remains conducting and a pulse cannot be produced across the transformer 22. However, when the anode of rectifier 10 becomes positive with respect to its cathode such that it can fire, the output of amplifier 48 becomes negative. This negative voltage is blocked by diode 51. Under these circumstances, the logic pulse 36 can cut off transistor 28 to produce a firing pulse for gate electrode 16. The result, of course, is that the firing pulse will not be produced unless the correct polarity exists across the rectifier 10.

Although the invention has been shown in connection with a certain specific embodiment, it will be readily apparent to those skilled in the art that various changes in form and arrangement of parts may be made to suit requirements without departing from the spirit and scope of the invention. In this respect, it will be appreciated that the transistor 28 can be normally OFF rather than normally ON and the logic pulse used to turn it ON with the same overall effect. Furthermore, it will be appreciated that while a single controlled rectifier has been shown herein for purposes of simplicity, in some cases two rectifiers will be employed, connected back-to-back whereby a portion of both the negative and positive half cycles can be applied to the load.

It should be understood that the specific embodiments disclosed herein, are by way of example only, and are not to be construed as limiting the invention thereto.

I claim as my invention:

1. In combination, a semiconductive controlled rectifier having an anode, a cathode and a gate electrode, a source of alternating current potential and a load impedance connected in series with said anode and cathode, isolation transformer means having primary and secondary winding means, means connecting said secondary winding means between the gate and cathode of said controlled rectifier, a normally-conducting transistor having its emitter and collector connected in series with said primary winding means, a source of potential of one polarity connected to the base of said transistor to render it conducting, means including a Zener diode for applying a logic pulse of the opposite polarity to said transistor, said pulse being of sufficient amplitude to override said source of potential and cut off the transistor, a common mode isolation amplifier having a pair of inputs connected to the anode and cathode of said controlled rectifier and adapted to produce an output of said one polarity when the anode of said controlled rectifier is negative with respect to said cathode, and means including an isolation diode and a Zener diode for applying said output of one polarity to said base of the transistor to maintain it conducting even though a logic pulse is applied to the base.

2. The combination of claim 1 wherein said means connecting said secondary winding means between the gate and cathode of said controlled rectifier includes a unidirectional current device.

* * * * *